United States Patent [19]

Turi et al.

[11] Patent Number: 5,536,561
[45] Date of Patent: Jul. 16, 1996

[54] STRAIGHT WEBS AND PROCESS OF MAKING

[75] Inventors: Eran (Ron) Turi, Springfield Hamden; Daniel D. Olesiuk, South Hadley Hampshire, both of Mass.

[73] Assignee: Rexham Graphics Inc., South Hadley, Mass.

[21] Appl. No.: 35,616

[22] Filed: Mar. 23, 1993

[51] Int. Cl.$^6$ .................................................. B32B 9/00
[52] U.S. Cl. ..................... 428/212; 428/35.2; 428/35.4; 428/284; 428/296; 428/298; 428/339; 428/369; 428/458; 428/475.5; 428/480; 264/210.6; 264/291; 156/160; 156/275.3
[58] Field of Search ............................ 428/195, 212, 428/475.5, 480, 339, 910, 913, 192, 474.9, 458, 35.4, 35.2, 284, 296, 298; 264/210.6, 291; 156/160, 275.3

[56] References Cited

U.S. PATENT DOCUMENTS

| | | | |
|---|---|---|---|
| 4,652,409 | 3/1987 | Leese et al. | 264/22 |
| 4,963,209 | 10/1990 | Chernega et al. | 156/160 |
| 5,225,139 | 7/1993 | Wajsbrot et al. | 204/514 |

*Primary Examiner*—Patrick J. Ryan
*Assistant Examiner*—Abraham Bahta
*Attorney, Agent, or Firm*—Burns, Doane, Swecker & Mathis

[57] ABSTRACT

A multi-layered web is produced by providing a first layer comprised of a strip of biaxially oriented polymeric film characterized by an inherent tendency to bend within its own plane. The strip is tensioned so as to overcome the bending tendency and assume a straight orientation. While the strips is held straight, a second layer of material is adhered to the strip. The second layer counteracts the bending tendency of the first layer so that when the tensioning forces are released, the web is straight. The first and second layers may comprise first and second strips of plastic film, respectively, which are arranged such that the bending tendencies of the strips are oriented opposite one another. The strips are adhered together by an adhesive material, or by being directly fused together. Alternatively, the second layer may comprise a coating applied to the plastic strip. The coating can be applied to one or both sides of the strip.

8 Claims, 2 Drawing Sheets

FIG. 6
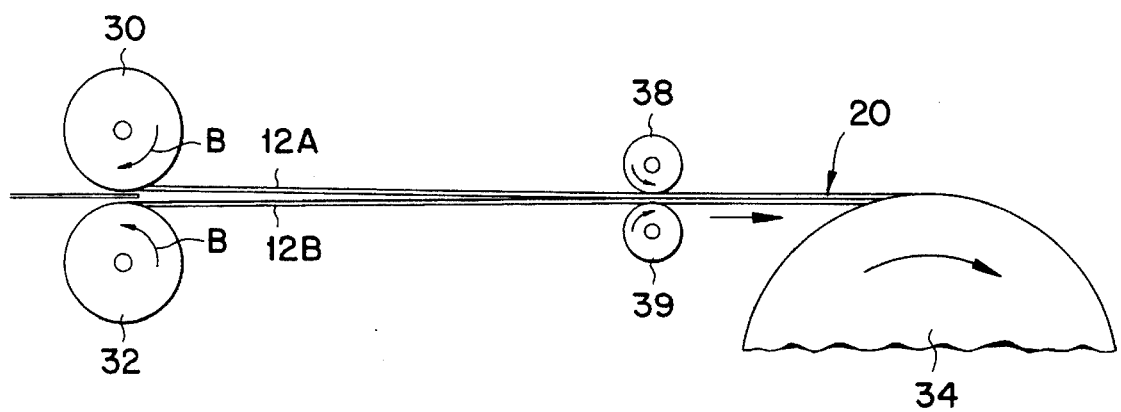
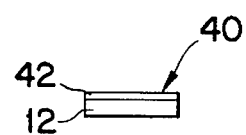
FIG. 7A
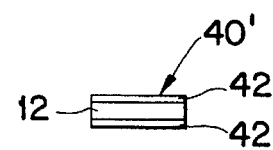
FIG. 7B

STRAIGHT WEBS AND PROCESS OF MAKING

BACKGROUND OF THE INVENTION

The present invention relates to plastic film, such as biaxially oriented plastic film, and to methods of making such film so that the film exhibits a high degree of straightness.

Biaxially oriented plastic film, such as PET, nylon, polypropylene, PVC, etc., is used in numerous applications which require that the film exhibit a high degree of inherent straightness. For example, plotters such as electrographic plotters, pen plotters, laser plotters, etc., used in the design of aircraft and automobiles function to plot lines on electrographic film. The film is pulled through the plotter as lines are inscribed thereon. Upon being removed from the plotter, it is essential that the film remain straight to insure that the lengths of the lines do not change. It will be appreciated that if the film were to bend within its own plane, the lines formed on the film would also bend, whereby the linear lengths of the lines would be reduced. A shortening of even ten mils per one hundred inches of line length may be unacceptable in certain situations. As an example, such a situation arises in the making of drawings for aircraft parts requiring tight manufacturing tolerances.

It will also be appreciated that if two lines of equal length were formed, one at each side of the web, the shortening of the two lines that would occur were the film to bend, would be unequal for each line and would result in unequal line lengths. A difference in the length of the lines of even ten mils per one hundred inches of line length may be unacceptable in certain situations, as mentioned above.

Those restrictions are of importance, because of the particular characteristics imparted to the film by the manufacturing process. For example, film formed of biaxially oriented PET is typically formed by a technique in which PET material is stretched biaxially, i.e., stretched in the machine direction as well as the cross direction, in the process of being formed into a sheet 10 of film of given width W (see FIG. 1). The film is then cut lengthwise into strips 12 of narrower width W' and processed into a final product, such as electrographic film.

However, due to the internal stress profiles imparted to the film sheet 10 by the biaxial stretching, each individual strip will inherently tend to bend within its own plane, as shown in a somewhat exaggerated manner in FIG. 2. (It is possible that a strip cut from the center of the sheet would not exhibit such a bending tendency if the center of stress of the sheet happened to coincide exactly with the longitudinal center of the strip cut therefrom and if the stress profile were symmetric about the longitudinal center of the web.) If a strip exhibiting such a bending tendency were passed through an electrographic plotter, the strip would be temporarily straightened by the tension applied by the feed mechanism, so that straight lines would be inscribed thereon by the plotter. However, once removed from the plotter, the strip would reassume its curved configuration, whereby the lines would become unacceptably shortened and two lines of originally equal length would become unacceptably unequal in length.

In order to avoid the above-described problem, it has been the practice to attempt to cut a strip 12 from the center of the sheet 10 such that the center of stress of the sheet coincides with the longitudinal center of the strip. This is very difficult and time consuming to accomplish, however, because the center of stress of the sheet does not necessarily lie along the geometrical center of the sheet, nor is the stress profile necessarily symmetric about the geometrical center of the sheet.

Another possible way of dealing with the bending problem would be to trim the curvature from the sides of a curved strip 12, i.e., by cutting the strip of FIG. 2 along trim lines 14. However, it will be realized that, due to the curvature of the strip, the longer the strip, the shorter will be the width of the resulting trimmed strip. Hence, this technique would be viable only to make strips of limited length.

Furthermore, the center-cut technique and the trimming technique described above would each result in a considerable waste of film since the outer portions of the film sheet, or the trimmed portions of each film strip, would be discarded.

Therefore, it would be desirable to provide a straight strip of biaxially oriented plastic film of any desired length without resulting in an appreciable wastage of film.

SUMMARY OF THE INVENTION

The present invention involves a multi-layered web comprising a first layer of plastic film characterized by an inherent tendency to bend within its own plane, and a second layer of material adhered to the first layer and counteracting the tendency thereof to bend, so that the web is straight.

The second layer preferably comprises a second layer of plastic film characterized by an inherent tendency to bend within its own plane in a direction opposite the first layer, so that the bending tendencies of the first and second layers oppose and counteract one another. Those first and second layers can be adhered together by an adhesive material disposed therebetween. Alternatively, the first and second layers can be directly fused together.

As an alternative embodiment, the second layer may comprise a coating applied to one or both sides of the first layer.

The invention also pertains to a method of producing a multi-layered web comprising the steps of:

A. providing a first layer comprised of a strip of plastic film characterized by an inherent tendency to bend within its own plane, B. holding the first layer straight in a manner overcoming the bending tendency thereof, C. during step B, adhering to the first layer a second layer of material, and D. terminating step B such that the second layer counteracts the bending tendency of the first layer and maintains the web straight.

Preferably, the first and second layers comprise first and second strips of plastic film, respectively, each strip characterized by an inherent tendency to bend within its own plane. Step B comprises holding the first and second strips straight and in superimposed relationship such that the bending tendencies of the strips are oriented opposite one another. Step C may comprise introducing an adhesive material between the strips, or Step C may comprise directly fusing the first and second strips together.

As an alternative, Step C may comprise coating one or both sides of the first layer with a second layer comprised of a coating material that is sufficiently stiff to counteract the bending tendency of the first layer.

BRIEF DESCRIPTION OF THE DRAWINGS

The objects and the advantages of the invention will become apparent from the following detailed description of preferred embodiments thereof in connection with the accompanying drawings in which like numerals designate like elements and in which:

FIG. 6 is a schematic side elevational view of an apparatus for longitudinally tensioning the strips depicted in FIG. 5;

FIG. 7A is an end view of an alternative web according to the present invention; and FIG. 7B is an end view of yet another embodiment of a web according to the present invention.

DETAILED DESCRIPTION OF PREFERRED EMBODIMENTS OF THE INVENTION

Figure 3:
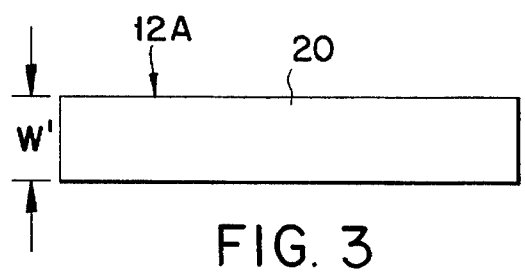
FIG. 3 is a plan view of a multi-layered web according to the present invention.
Figure 4A:
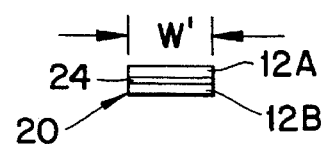
FIG. 4A is an end view of the web depicted in FIG. 3.

Depicted in FIGS. 3 and 4A is a straight web 20 formed in accordance with a first embodiment of the present invention. That web is a multi-layered web which includes first and second strips 12A, 12B of biaxially oriented flexible polymer film such as PET, nylon, polypropylene, PVC, etc., and a bonding adhesive 24 sandwiched between the strips 12A, 12B to adhere the strips together in superimposed relationship. The strips can be of any suitable thickness, e.g., from 0.4 to 10 mil thickness.

Figure 1:
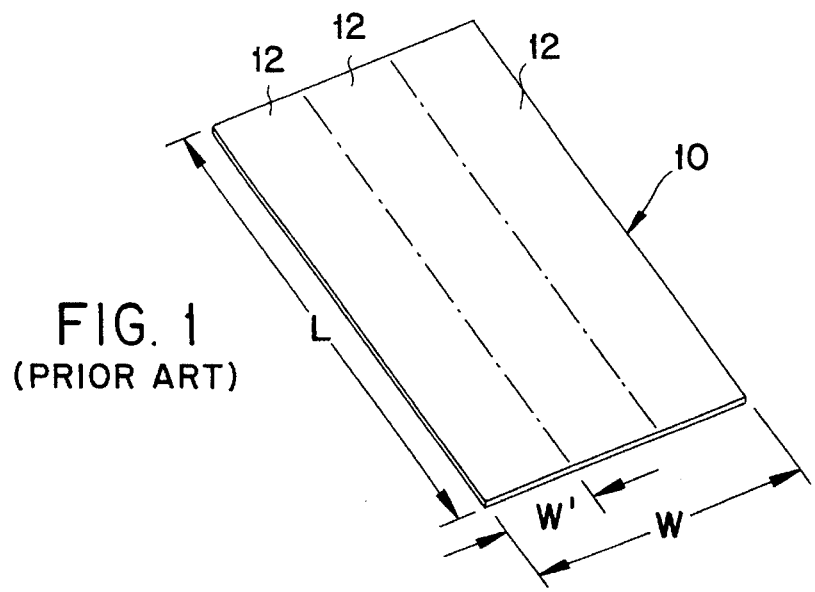
FIG. 1 is a perspective view of a prior art sheet of biaxially oriented polymeric film.
Figure 2:
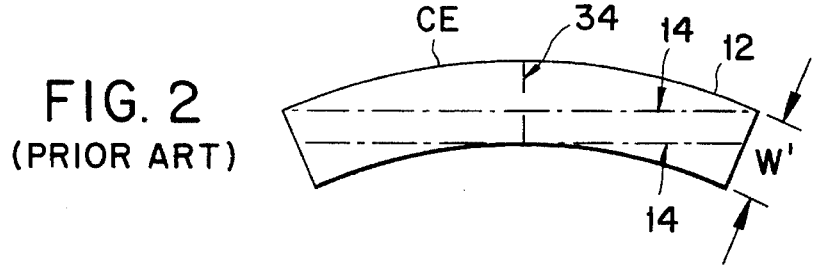
FIG. 2 is a plan view of a strip cut from the sheet of FIG. 1 and characterized by an inherent tendency to bend within its own plane.

Each strip 12A, 12B has been manufactured by the earlier-described biaxial stretching method and exhibits an inherent tendency to bend (i.e., to assume a curved configuration) within its own plane (as shown in FIG. 2). However, in accordance with the present invention, those tendencies are effectively resisted so that the web itself remains straight due to a process which includes (a) arranging the strips 12A, 12B in superimposed relationship such that their bending tendencies are oppositely directed (as represented in solid lines in FIG. 5), (b) straightening the strips 12A, 12B by applying and maintaining a tension on the strips (as represented by phantom lines in FIG. 5), and (c) adhering the strips 12A, 12B together while the straightening forces are maintained. As a result, the inherent and oppositely-directed bending tendencies of the two strips 12A, 12B counteract one another, such that the straightness of the web 20 is "locked-in".

Figure 4B:
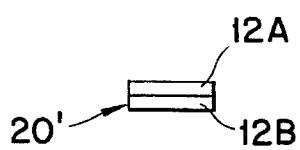
FIG. 4 is an alternative end view of the web depicted in FIG. 3.

In the web 20 shown in FIG. 4A, the strips are adhered together by the layer of adhesive 24. Instead of being adhered together by that adhesive 24, the strips 12A, 12B could be fused directly together by a heat sealing technique or by radiation curing to form a web 20' as shown in FIG. 4B.

Figure 5:
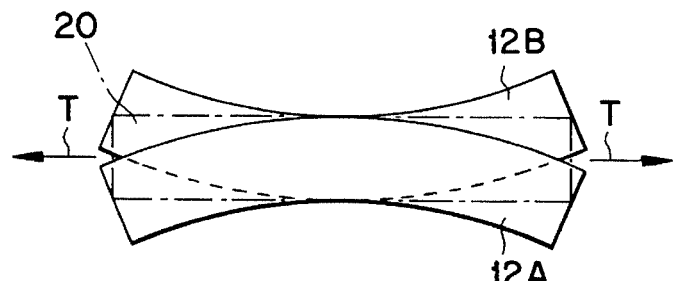
FIG. 5 is a plan view of two strips of film arranged one above the other, the strips characterized by a tendency to bend within their respective planes, the strips oriented such that the respective bending tendencies are opposed to one another, phantom lines depict the strips being longitudinally tensioned so as to assume a straight orientation.

The straightening of the strips 12A, 12B is accomplished by placing the strips in longitudinal tension by the application of tensile forces T (see FIG. 5). Such a straightening step per se does not permanently straighten the strips (i.e., the strips 12A, 12B would re-assume their curved configurations if the tensile forces were removed prior to the adhering step). Therefore, the tensile forces are maintained while the strips 12A, 12B are adhered together. One of various possible ways of longitudinally tensioning the strips 12A, 12B involves unwinding the strips onto a master roller 34 from respective superimposed carrier rollers 30, 32 while applying a braking force B to each carrier roller 30, 32 (see FIG. 6). While the strips are thus tensioned, the unwound adhesive 24 is injected between the strips by a nozzle 36 to form the web 20 shown in FIG. 4A, or the heat-sealing step is performed which directly fuses the strips together to form the web 20' shown in FIG. 4B.

The adhesive 24 may comprise any suitable adhesive, such as polyethylene, inomer, epoxy resin, etc., and can be applied as a hot melt or a cold pressure-sensitive adhesive. If a cold pressure-sensitive adhesive is employed, then the strips 12A, 12B should be pressed against one another, e.g., by passing the strips between nip rollers 38, 39 shown in FIG. 6. The adhesive layer will aid in holding the web 20 flat.

It would also be possible to pre-apply the adhesive to one of the strips 12A, 12B and then cover the adhesive with a release layer that is removed prior to the joining of the two strips.

As the strips are tensioned, it will be appreciated that the two longitudinal edges of each strip 12A, 12B become straightened. The longer of the two edges, i.e., the convex edges CE (see FIG. 2), will initially become wrinkled during the straightening step. Then, the wrinkles will be removed when the strips have become suitably straightened. Hence, sufficient tension should be applied to remove the wrinkles in order to ensure straightness.

The degree of straightness exhibited by the thus-formed web 20 or 20' depends upon a number of factors, including the elastic moduli and thickness of the strips, and how closely the curvatures of the strips 12A, 12B match. If a high degree of straightness is not required, strips with different degrees of curvature could be adhered together.

However, if a high degree of straightness is required, there should be used strips 12A, 12B which have been manufactured sequentially during the biaxial stretching technique, because such strips will possess virtually identical bending characteristics. Thus, for example, a strip 12 shown in FIG. 2 could be cut transversely in half along cut line 34 to produce the two shorter strips 12A, 12B which are to be adhered together. Those strips 12A, 12B constitute sequentially manufactured strips.

As an example, a web 20 was made by adhering together two strips of 2.65 mil thick strips of polyester using a hot melt adhesive of low density polyethylene therebetween. The adhesive was applied in a thickness of 1.0 mil.

A second preferred embodiment of the present invention involves the use of only one strip 12 which is placed under a strip-straightening tension while having applied thereto a layer 42 of coating material on only one side (see FIG. 7A) or on both sides (see FIG. 7B). When the coating layers(s) 42 cures and solidifies, the tension is released, whereupon the coating layer "locks-in" the straightness of the strip to form a straight web 40 (FIG. 7A) or 40' (FIG. 7B). The coating can be applied in any conventional manner, such as extrusion coating, solvent coating, etc.

The coating itself can comprise any suitable material such as polyethylene, polypropylene, polyester, polyurethane, epoxy, etc. The coating can be of the same material as the strip, or different therefrom.

The coating(s) is applied in a sufficient thickness to ensure that the coating(s) will be sufficiently stiff, i.e., preferably at least as stiff as the strip 12, to effectively resist the inherent bending tendency of the strip.

The degree of straightness of the web 40 or 40' depends on a variety of factors, including the elastic modulus and thickness of the strip 12, and also on the degree of inherent curvature of the strip 12.

Applying coating layers 42 to both sides of the strip 12 (FIG. 7B) provides a greater resistance to curling-up of the web as compared with a single-sided coating. That is, a double-sided coating is better able to hold the web flat.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A multi-layered web comprising a straight first layer of biaxially oriented, longitudinally stretched, plastic film characterized by an inherent tendency to bend within its own plane, and a straight second layer of biaxially oriented, longitudinally stretched material adhered to said first layer and counteracting said tendency thereof to bend, so that said web is straight, wherein said second layer comprises a plastic film characterized by an inherent tendency to bend within its own plane in a direction opposite of said first layer, so that the bending tendencies of said first and second layers oppose and counteract one another.

2. A multi-layered web according to claim 1, wherein said second layer comprises a second layer of plastic film characterized by an inherent tendency to bend within its own plane in a direction opposite of said first layer, so that the bending tendencies of said first and second layers oppose and counteract one another.

3. A multi-layered web according to claim 2, wherein said first and second layers are adhered together by an adhesive material disposed therebetween.

4. A multi-layered web according to claim 2, wherein said first and second layers are adhered together by an extrusion-coated material disposed therebetween.

5. A multi-layered web according to claim 1, wherein said plastic film comprises a polymer selected from the group comprised of PET, nylon, polypropylene, and PVC.

6. A multi-layered web comprising straight first and second strips of biaxially oriented, longitudinally stretched polymeric film adhered together in superimposed relationship, each said strip being characterized by an inherent tendency to bend within its own plane, said first and second strips being oriented such that their bending tendencies are oppositely directed to counteract one another, so that said web is straight.

7. A multi-layered web according to claim 6, wherein said first and second strips are adhered together by an adhesive material disposed therebetween.

8. A multi-layered web according to claim 6, wherein said first and second strips comprise the same polymeric material.

* * * * *